US005634688A

United States Patent [19]

Ellis

[11] Patent Number: 5,634,688

[45] Date of Patent: Jun. 3, 1997

[54] RECLINING CHAIR

[75] Inventor: Walter J. Ellis, Wadena, Minn.

[73] Assignee: Homecrest Industries, Incorporated, Wadena, Minn.

[21] Appl. No.: 634,648

[22] Filed: Apr. 18, 1996

[51] Int. Cl.[6] ................................ B60N 2/02; B60N 2/22

[52] U.S. Cl. ........................ 297/358; 297/353; 297/354.1

[58] Field of Search ................................ 297/353, 354.1, 297/354.12, 358, 284.7

[56] References Cited

U.S. PATENT DOCUMENTS

| | | | |
|---|---|---|---|
| 1,007,985 | 11/1911 | Smith . | |
| 1,246,209 | 11/1917 | Witter . | |
| 1,685,599 | 9/1928 | Fletcher . | |
| 1,970,800 | 8/1934 | Herreshoff | 297/358 |
| 4,362,336 | 12/1982 | Zapf et al. . | |
| 4,452,486 | 6/1984 | Zapf et al. . | |
| 4,676,550 | 6/1987 | Neve De Mevergnies | 297/353 |
| 4,797,960 | 1/1989 | Vaiana et al. | 297/353 |
| 5,150,948 | 9/1992 | Völkle | 297/353 |
| 5,181,762 | 1/1993 | Beumer | 297/358 |
| 5,320,412 | 6/1994 | Eakins et al. | 297/353 |

FOREIGN PATENT DOCUMENTS

| | | | |
|---|---|---|---|
| 0268173 | 3/1927 | United Kingdom | 297/354.12 |

*Primary Examiner*—Peter M. Cuomo
*Assistant Examiner*—Anthony D. Barfield
*Attorney, Agent, or Firm*—Kinney & Lange, P.A.

[57] ABSTRACT

A reclining chair that avoids skin shear. The reclining chair has a seat, a backrest, and a backrest surface. The backrest is pivotably attached to the seat. The backrest surface is slidably mounted with respect to the backrest. Pivoting of the backrest with respect to the seat causes the backrest surface to slide with respect to the backrest. Sliding of the backrest surface with respect to the backrest maintains the backrest surface at a constant position relative to a back of a person sitting on the reclining chair.

15 Claims, 3 Drawing Sheets

RECLINING CHAIR

BACKGROUND OF THE INVENTION

The present invention relates generally to a reclining chair that does not cause skin shear. More particularly, the present invention relates to a reclining chair in which a backrest cushion slides with respect to a backrest as the backrest is pivoted with respect to a seat.

There are many situations where it is desirable to have a chair in which the backrest of the chair reclines with respect to a seat. In prior art reclining chairs, a seat cushion is fixedly mounted to the seat and a backrest cushion is fixedly mounted to the backrest. Pivoting of the backrest with respect to the seat increases a distance between the backrest cushion and the seat cushion.

When a person is sitting on the reclining chair, increasing the distance between the backrest cushion and the seat cushion changes a position of the backrest cushion with respect to the person's back. Changing the position of the backrest cushion with respect to the person's back produces shear forces on the portions of the person's back that are in contact with the backrest cushion.

When the reclining chair is used by a person having delicate skin, such as an elderly person, the skin is unable to accommodate the amount of displacement caused by the movement of the backrest cushion. Depending on the condition of the person's skin, the movement of the backrest cushion may cause skin abrasions or even rupture.

Regardless of the extent of the physical effects, skin shear is undesirable and should be avoided. Prior to the present invention, no reclining chair adequately compensated for skin shear.

Several patents disclose pivotably mounting a backrest to a seat to form a reclining chair. For example, Zapf et al. U.S. Pat. Nos. 5,367,336 and 4,452,486 disclose structures in which sliding of the seat away from the backrest causes the backrest to pivot with respect to the seat and thereby move the chair into a reclined position.

Smith U.S. Pat. No. 1,007,985 describes a chair having a backrest that is attached to a frame using belts and pulleys. The mounting of the backrest allows the backrest to be manually adjusted in a vertical direction.

Neve De Mevergnies U.S. Pat. No. 4,676,550 discloses an automobile seat having a backrest cushion that is mounted using a belt and pully system so that the backrest cushion can oscillate up and down in response to the automobile hitting bumps on a roadway. Neve De Mevergnies indicates that such a configuration minimizes stress placed on the back of a person sitting in the chair.

SUMMARY OF THE INVENTION

The present invention includes a reclining chair having a seat and a backrest, which is pivotably mounted to the seat. The reclining chair also has a backrest cushion that is slidably mounted on the backrest. Pivoting of the backrest with respect to the seat causes the backrest cushion to slide with respect to the backrest. Sliding of the backrest cushion with respect to the backrest maintains the backrest cushion in a constant position relative to a back of a person sitting on the reclining chair.

DETAILED DESCRIPTION OF THE PREFERRED EMBODIMENTS

Figure 1:
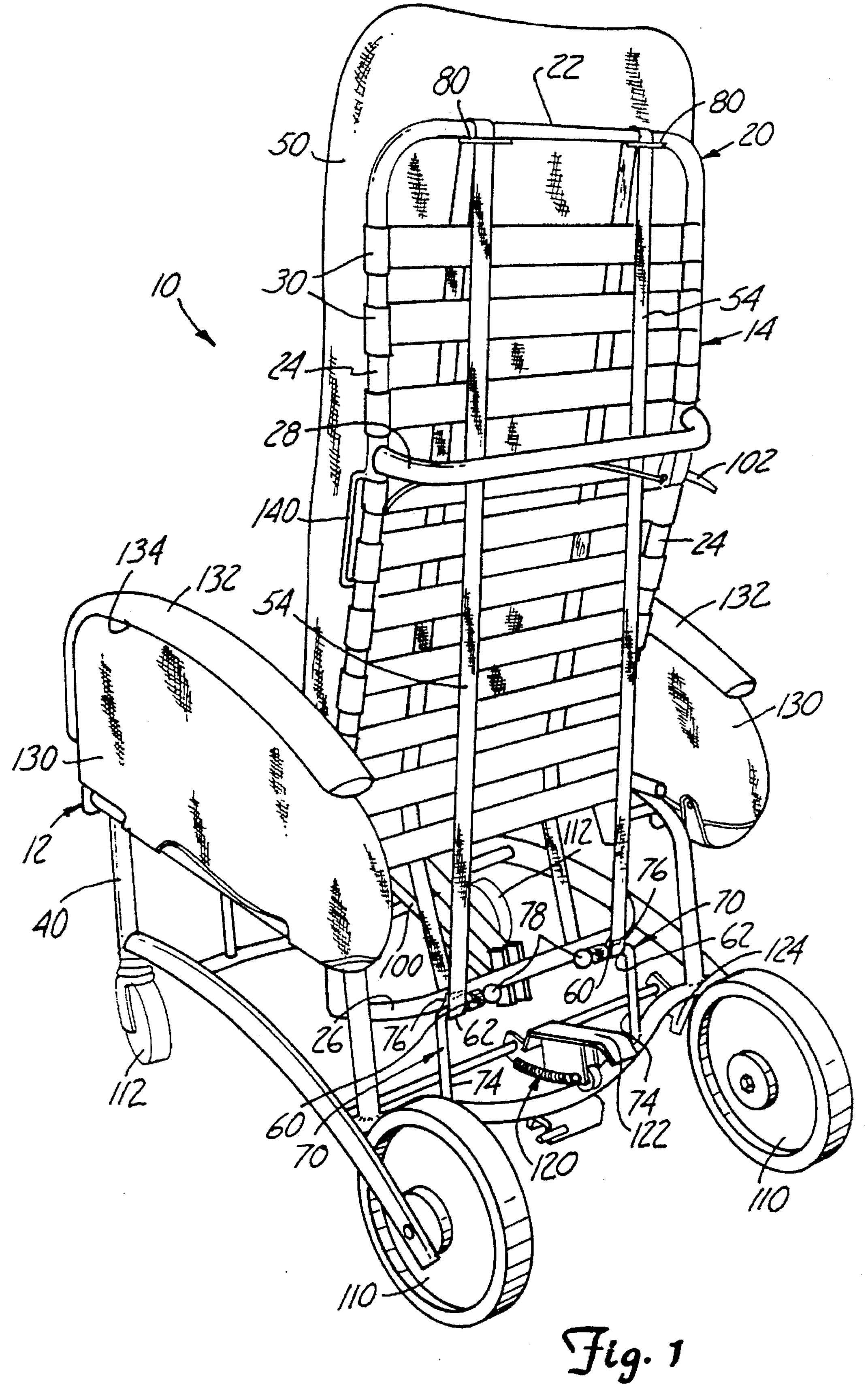
FIG. 1 is a perspective view of a reclining chair according to the present invention.
Figure 2:
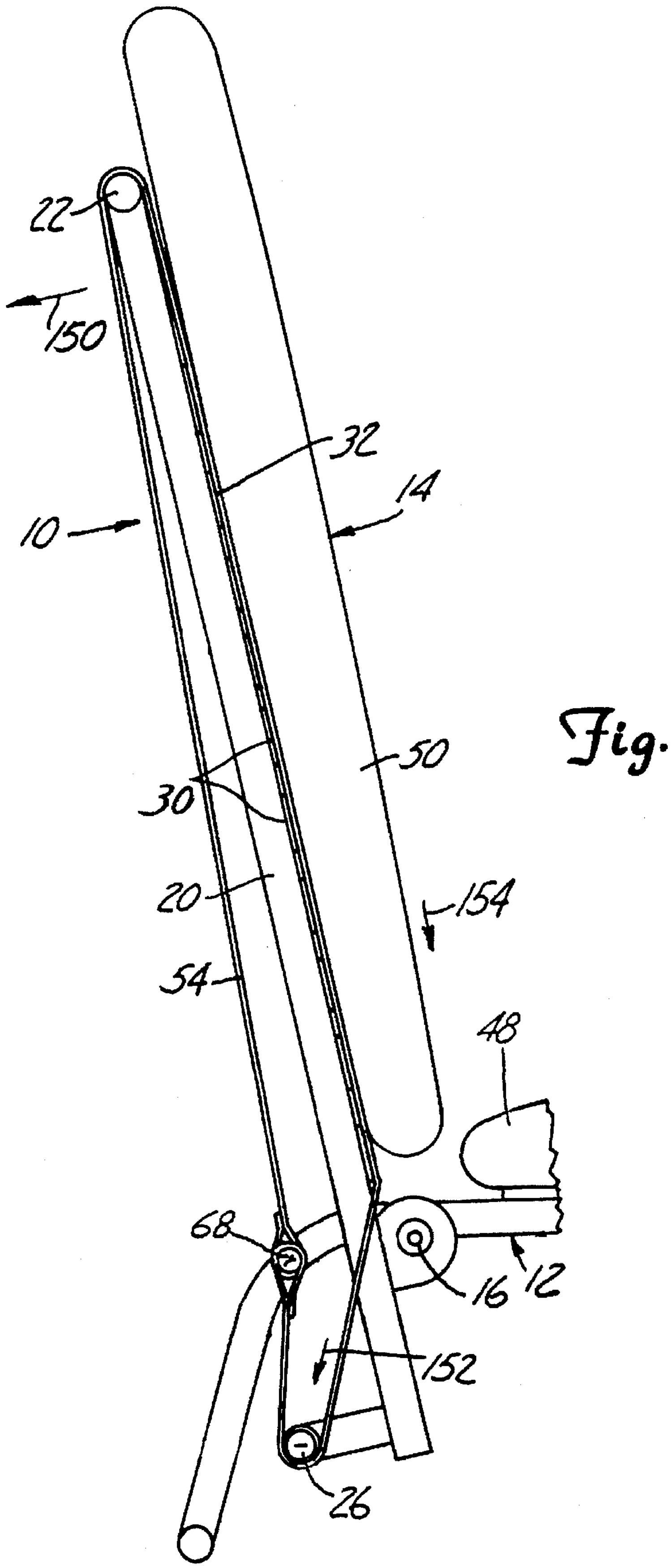
FIG. 2 is a sectional view of the reclining chair in an upright position.
Figure 3:
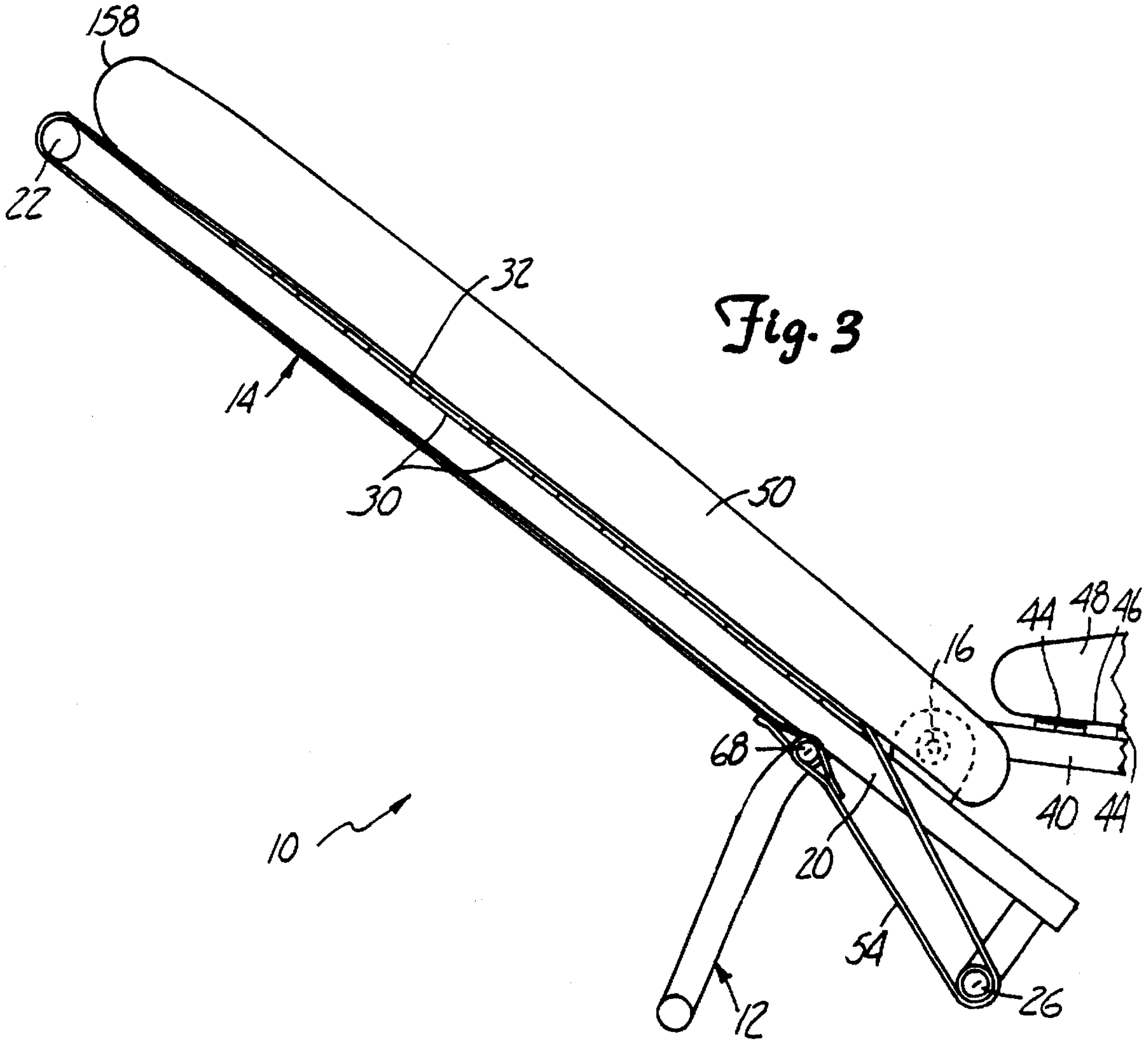
FIG. 3 is a sectional view of the reclining chair in a reclined position.

The present invention includes a reclining chair, as most clearly illustrated at 10 in FIG. 1. The reclining chair 10 has a seat 12 and a backrest 14. The backrest 14 is pivotably connected to the seat 12 so that backrest is pivotable about an axis 16, as illustrated in FIGS. 2 and 3. Pivotably mounting the backrest 14 to the seat 12 allows the reclining chair 10 to move from an upright position, illustrated in FIG. 2, to a reclined position, illustrated in FIG. 3.

The backrest 14 includes a frame 20 that extends around the outside of the backrest 14, as depicted in FIG. 1. The frame 20 is preferably fabricated from a rigid metallic material, such as aluminum or steel. The frame 20 is preferably constructed with a top member 22, a pair of side members 24, and a bottom member 26. The frame 20 also preferably includes a reinforcing bar 28 that is mounted to extend between the side members 24 approximately intermediate between the top member 22 and the bottom member 26. In addition to providing additional strength to the frame 20, the reinforcing bar 28 provides a handle that may be used for moving the reclining chair 10.

A backrest support surface 32 is formed on the backrest 14 using a plurality of straps 30. The straps 30 are attached to the frame 20 in a horizontal relationship so that the straps 30 extend between the side members 24. The straps 30 are preferably formed from a plastic material that stretches to a small degree when a force is applied but returns to the original shape when the force is removed.

The seat 12 preferably has a structure that is similar to the backrest 14. In particular, the seat 12 preferably includes a frame 40, which is formed from a metallic material, such as aluminum or steel. The seat 12 includes a seat support surface 46 that is formed from a plurality of straps 44, as most clearly illustrated in FIG. 2. The seat straps 44 are mounted to the seat frame 40 in a spaced-apart relationship. Similar to the backrest straps 30, the seat straps 44 are preferably formed from a plastic material that stretches to a small degree when a force is applied but returns to the original shape when the force is removed.

The reclining chair 10 has a seat cushion 48 that is positioned on the seat support surface 46. The seat cushion 48 preferably has an expanded foam core that is covered with a durable waterproof covering material. One of ordinary skill in the art will appreciate that the expanded foam core and the covering material may be varied depending on the intended use for the reclining chair of the present invention.

A backrest cushion 50 is slidably mounted on the backrest 14 adjacent the backrest support surface 32. Similar to the seat cushion 48, the backrest cushion 50 is constructed from an expanded foam core that is covered by a durable waterproof covering material. While the present invention is described with respect to mounting cushions on the seat 12 and the backrest 14, other seating surfaces may be used without departing from the scope of the present invention.

The mounting of the backrest cushion 50 on the backrest 14 allows the backrest cushion 50 to slide longitudinally with respect to the backrest 14 as the backrest 14 is pivoted with respect to the seat 12. More particularly, the backrest cushion 50 slides toward the seat cushion 48 in direct relationship to the degree to which the backrest 14 is reclined with respect to the seat 12.

Sliding the backrest cushion 50 towards the seat cushion 48 allows a person's back (not shown) to be maintained at a constant position relative to the backrest cushion 50. Because the person's back is maintained at a constant position relative to the backrest cushion 50, the reclining chair 10 of the present invention does not cause skin shear on the person's back.

A pair of belts 54 preferably retain the backrest cushion 50 on the backrest 14 and allow the backrest cushion to slide with respect to the backrest 14 as the backrest 14 is pivoted with respect to the seat 12. The belts 54 are preferably either sewn to the backrest cushion 50 or attached to the backrest cushion 50 using a removable fastening device such as a VELCRO fastener. The belts 54 preferably encircle the backrest 14 in a generally longitudinal orientation so that the belts 54 pass over the top and bottom members 22, 26 of the backrest frame 20.

Each belt 54 is attached to the seat frame 40. Attachment of the belts 54 to the seat frame 40 causes the belts 54 to vertically slide with respect to the backrest 14 as the backrest 14 is pivoted with respect to the seat 12. The belts 54 are preferably removably attached to the seat frame 40 using loops 60 that are formed at opposite ends 62 of each belt 54.

The ends 62 of each belt 54 are preferably attached to the seat 12 using a belt retaining mechanism 70. The point at which the ends 62 are attached to the seat 12 is referred to as a fixed point 68 because this point does not move as the backrest 14 is pivoted with respect to the seat 12.

The belt retaining mechanism 70 preferably includes a substantially cylindrical member that is bent to form a vertical portion 74 and a horizontal portion 76. The cylindrical member is attached to the seat frame 40 through the vertical portion 74. An enlarged end portion 78 is attached to an end of the horizontal portion 76 opposite the vertical portion 74.

The loops 60 are formed with a size that is greater than the horizontal portion 76 and the enlarged end portion 78. This configuration allows the loops 60 to be moved over the enlarged end portion 78 and then onto the horizontal portion 76. Once the loop 60 is moved onto the horizontal portion 76, the enlarged end portion 78 prevents the ends 62 from sliding laterally off the belt retaining mechanism 70.

To retain the belts 54 at a desired location on the top section 22, the top section 22 preferably includes a belt guide 80 for each belt 54. The belt guide 80 allows the belt 54 to slide longitudinally with respect to the backrest 14 while preventing the belt 54 from sliding laterally on the backrest 14.

The reclining chair 10 also preferably includes a tilt mechanism 100 that controls the pivoting of the backrest 14 with respect to the seat 12. Once the backrest 14 is in a desired position with respect to the seat 12, the tilt mechanism 100 retains the backrest 14 in the desired position. One suitable structure for the tilt mechanism 100 is a piston and cylinder structure where one end of the structure is attached to the bottom member 26 of the backrest frame 20 and the other end of the structure is attached to the seat frame 40.

Operation of the tilt mechanism 100 is controlled by a reclining control 102. The reclining control 102 is preferably mounted to the backrest frame 20 to allow the tilt mechanism 100 to be readily operated. The reclining control 102 is operable in either an adjusting position or in an engaging position. When the reclining control 102 is in the adjusting position, the tilt mechanism 100 allows the backrest 14 to pivot with respect to the seat 12. When the reclining control 102 is in the engaging position, the tilt mechanism 100 prevents the backrest 14 from pivoting with respect to the seat 12. Using the engaging position thereby enables the reclining chair 10 to be maintained at a selected degree of reclination.

To assist in moving the reclining chair 10, the reclining chair 10 is preferably mounted on a plurality of wheels. The plurality of wheels includes a pair of rear wheels 110 that are attached to the seat frame 40 proximate to an end of the seat 12 where the backrest 14 attaches to the seat 12.

The plurality of wheels also includes a pair of front wheels 112. The front wheels 112 are attached to the seat frame 40 at an end of the seat 12 opposite the rear wheels 110. The front wheels 112 are preferably also mounted to pivot about an axis that is normal to rotational axis of the front wheels 112. Pivoting of the front wheels 112 allows the reclining chair 10 to be moved in a variety of directions.

The reclining chair 10 further preferably includes a brake mechanism 120 that is mounted to the seat frame 40. The brake mechanism 120 preferably has a brake engaging plate 122 and a pair of brake pads 124.

The brake engaging plate 122 is operable with an operator's foot. The brake engaging plate 122 is preferably configured so that downward pressure on the brake engaging plate 122 activates the brake mechanism 120 by moving the brake pads 124 into frictional contact with the rear wheels 110 to prevent the rear wheels 110 from rolling. Conversely, upward pressure upon the engaging plate 122 deactivates the brake mechanism 120 by allowing the brake pads 124 to move away from the rear wheels 110.

The reclining chair 10 also preferably includes side supports 130 that are mounted along opposite sides of the seat 12. The side supports 130 help to retain a person in a seated position on the reclining chair 10. The side supports 130 also preferably include an arm cushion 132 that substantially covers an upper edge 134 of the side support 130. The side supports 130 and the arm cushions 132 are preferably constructed from a frame that is covered with expanded foam and then a waterproof plastic covering material, which is similar to the covering material used on the seat and backrest cushions 48, 50.

The reclining chair 10 further preferably includes restraining strap guides 140 that extend from each of the side sections 24. The restraining strap guides 140 are adapted to receive a restraining strap (not shown). Using the restraining strap in combination with the restraining strap guides 140 provides additional assistance in retaining a person in a seated position on the reclining chair 10.

In operation, the backrest 14 is initially in an upright position with respect to the seat 12, as most clearly illustrated in FIG. 2. Movement of the backrest 14 to a reclined position, as indicated by arrow 150, increases a distance between the fixed point 68 and the bottom member 26 which causes the belt 54 to slide downwardly with respect to the backrest 14, as indicated by arrow 152. Sliding of the belt 54 causes the backrest cushion 50 to slide downwardly with respect to the backrest 40, as indicated by arrow 154. The backrest cushion 50 moves towards the seat cushion 48 in a direct relationship to the degree the backrest 14 is reclined.

Pivoting of the backrest 14 continues until the backrest 14 is in the reclined position, as illustrated in FIG. 3. The backrest cushion 50 preferably slides downwardly approximately 3 inches when moving the reclining chair from the upright position to the reclined position. In spite of the sliding of the backrest cushion 50 on the backrest 14, an upper edge 158 of the backrest 14 preferably remains above the top member 22 when the reclining chair 10 is in the upright and reclined positions.

Sliding the backrest cushion 50 on the backrest 14 maintains the backrest cushion 50 at a constant position relative to a back of a person who is sitting on the reclining chair 10 with the person's back adjacent to the backrest cushion 50. As used herein, the phrase "constant position" means that the backrest cushion 50 does not slide longitudinally with respect to the person's back as the backrest 14 is pivoted from the upright position to the reclined position. Sliding the backrest cushion 50 on the backrest 14 thereby compensates for opening up of an angle between the seat and backrest cushions 48, 50.

Because the backrest cushion 50 is retained in the constant position with respect to the person's back, the reclining chair 10 of the present invention eliminates skin shear that is associated with prior art reclining chairs. By eliminating skin shear, the reclining chair 10 of the present invention allows person's with delicate or injured skin to enjoy the benefits of using a reclining chair without experiencing discomfort.

One of ordinary skill in the art will appreciate that the distance the backrest cushion 50 must slide to avoid skin shear depends on a variety of factors including the thickness of the seat and backrest cushions 48, 50. The distance that the backrest cushion 50 slides on the backrest 14 may be varied by changing the location of the fixed point 68 with respect to the axis 16 and the bottom member 26. For example, the bottom member 26 may be offset from the plane of the backrest 14, as most clearly illustrated in FIG. 1.

Although the present invention has been described with reference to preferred embodiments, workers skilled in the art will recognize that changes may be made in form and detail without departing from the spirit and scope of the invention.

What is claimed is:

1. A reclining chair comprising:

a seat;

a backrest pivotally mounted to the seat;

a belt mounted to pass over the backrest, wherein the belt is attached to the seat at a point that is fixed with respect to the seat; and a backrest surface attached to the belt adjacent the backrest, wherein the belt and the backrest surface slide with respect to the backrest as the backrest is pivoted with respect to the seat.

2. The reclining chair of claim 1 wherein the backrest surface slides towards the seat in direct relationship to the degree that the backrest is tilted with respect to the seat.

3. The reclining chair of claim 2 wherein sliding of the backrest surface towards the seat maintains the backrest surface at a constant position relative to a back of a person sitting on the reclining chair as the reclining chair is moved from an upright position to a reclined position.

4. The reclining chair of claim 1 wherein the backrest pivots with respect to the seat about an axis, and wherein the fixed point is offset from the axis.

5. The reclining chair of claim 4 wherein a lower edge of the backrest is separated from the fixed point by a selected distance, and wherein pivoting of the backrest with respect to the seat changes the selected distance and causes the belt to slide with respect to the backrest.

6. The reclining chair of claim 1 and further comprising a tilt mechanism for controlling pivoting of the backrest with respect to the seat.

7. The reclining chair of claim 6 wherein the tilt mechanism is operable in an adjusting position and an engaging position, wherein the backrest is pivotable with respect to the seat when the tilt mechanism is in the adjusting position, and wherein the backrest is retained in a fixed position with respect to the seat when the tilt mechanism is in the engaging position.

8. A reclining chair comprising:

a seat;

a backrest pivotally connected to the seat;

a seat cushion attached to the seat;

a belt mounted to pass over the backrest, wherein the belt is fixedly attached to the seat at a point that is fixed with respect to the seat; and a backrest cushion attached to the belt adjacent the backrest, wherein pivoting of the backrest with respect to the seat causes the belt to slide with respect to the backrest and wherein sliding of the belt causes the backrest cushion to slide on the backrest.

9. The reclining chair of claim 8 wherein the backrest cushion slides towards the seat in direct relationship to the degree that the backrest is tilted with respect to the seat.

10. The reclining chair of claim 9 wherein sliding of the backrest cushion towards the seat maintains the backrest cushion at a constant position relative to a back of a person sitting on the reclining chair as the reclining chair is moved from an upright position to a reclined position.

11. The reclining chair of claim 8 wherein the backrest pivots with respect to the seat about an axis, and wherein the fixed point is offset from the axis.

12. The reclining chair of claim 11 wherein a lower edge of the backrest is separated from the fixed point by a selected distance, and wherein pivoting of the backrest with respect to the seat changes the selected distance and causes the belt to slide with respect to the backrest.

13. The reclining chair of claim 8 and further comprising a tilt mechanism for controlling pivoting of the backrest with respect to the seat.

14. The reclining chair of claim 13 wherein the tilt mechanism is operable in an adjusting position and an engaging position, wherein the backrest is pivotable with respect to the seat when the tilt mechanism is in the adjusting position, and wherein the backrest is retained in a fixed position with respect to the seat when the tilt mechanism is in the engaging position.

15. A method of reclining a reclining chair having a seat, a backrest pivotally attached to the seat, a belt that passes over the backrest, and a backrest cushion attached to the belt, the method comprising:

mounting the belt over the backrest and attaching the belt to the seat at a point that is fixed with respect to the seat;

pivoting the backrest with respect to the seat to move the chair from an upright position to a reclined position; and sliding the belt with respect to the backrest as the backrest is pivoted with respect to the seat, wherein sliding of the belt causes the backrest cushion to slide with respect to the backrest so that the backrest cushion is maintained at a constant position relative to a back of a person sitting on the reclining chair as the reclining chair is moved from the upright position to the reclined position.

* * * * *